Figure 5:
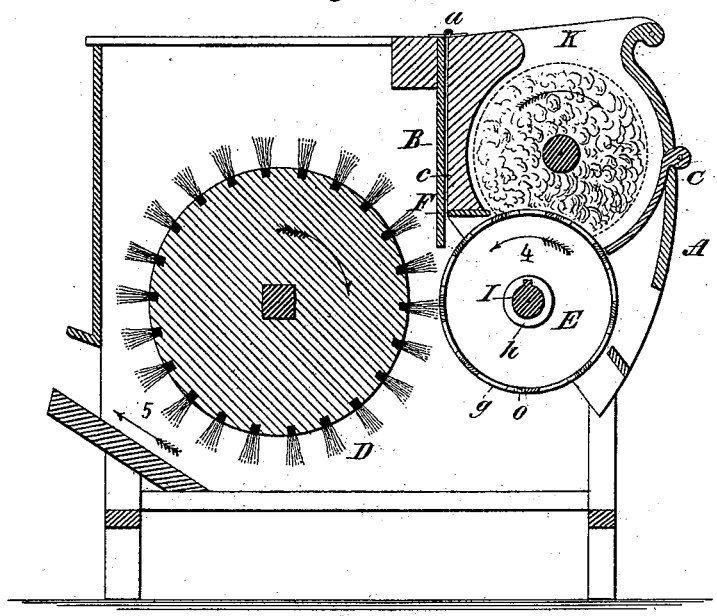

(No Model.)  2 Sheets—Sheet 1.
C. T. MASON, Jr.
COTTON GIN.
No. 316,280.  Patented Apr. 21, 1885.
Fig. 1.
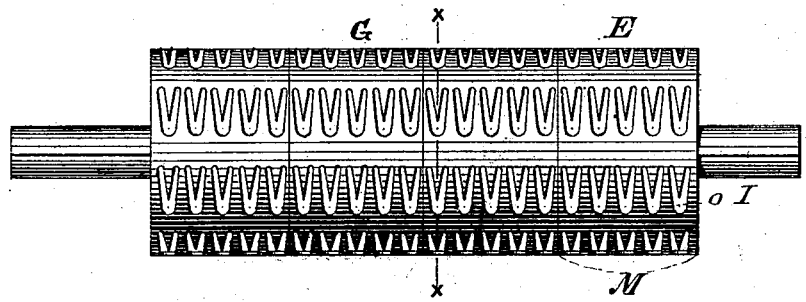
Fig. 2.
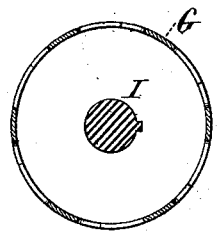
Fig. 4.  Fig. 3.
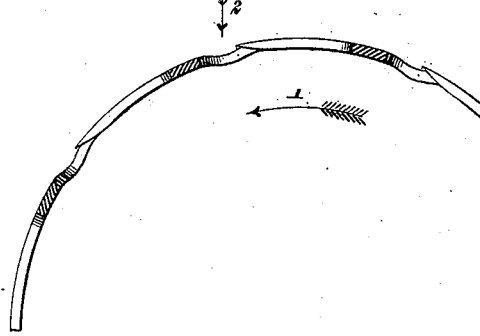 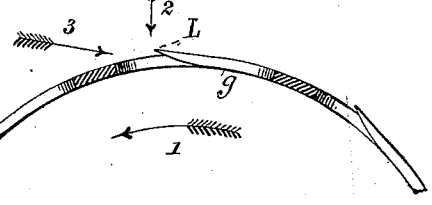
WITNESSES:
Gustave Dieterich
Fred'k Huetwohl
INVENTOR
Charles T. Mason Jr.
BY
Park Benjamin
ATTORNEY (No Model.) 2 Sheets—Sheet 2.

C. T. MASON, Jr.
COTTON GIN.

No. 316,280. Patented Apr. 21, 1885.

WITNESSES:
Gustave Dieterich
Fried. Kurtwohl

INVENTOR
Charles T. Mason Jr.
BY
Park Benjamin
ATTORNEY

UNITED STATES PATENT OFFICE.

CHARLES T. MASON, JR., OF SUMTER, ASSIGNOR, BY MESNE ASSIGNMENTS, TO THE MASON COTTON GIN CYLINDER COMPANY, OF CHARLESTON, S. C.

COTTON-GIN.

SPECIFICATION forming part of Letters Patent No. 316,280, dated April 21, 1885.

Application filed September 10, 1884. (No model.)

*To all whom it may concern:*

Be it known that I, CHARLES T. MASON, Jr., of Sumter, Sumter county, South Carolina, have invented a new and useful Improvement in Cotton-Gins; and I do hereby declare the following to be a full, clear, and exact description of the same.

The form of cotton-gin in most common use is that known as the "saw-gin." It consists, essentially, of a number of fine-toothed saws, the teeth of which project through slits or openings into a chamber in which the cotton to be cleansed is placed. The action of the teeth as the saws rotate upon a common axis is to draw out the fibers of the cotton, the seeds and other impurities or foreign substances being retained in the chamber.

Various improvements in the form and construction of the cotton-gin have been made without, however, obviating in marked degree many well-known difficulties and disadvantages incident to its use. Among the latter may be numerated, first, high cost of manufacture; second, need for frequent and expensive repair, owing to the dulling or breaking of the saws or of the ribs, which last form the partitions between the narrow slits through which the saws enter the cotton-receptacle; third, the constant care required in properly spacing saws and relatively adjusting the ribs both in respect to thickness and position, the removal of any one saw necessitating readjustment of the entire series; fourth, choking of the narrow spaces between the ribs; fifth, liability of two saws operating in the same space and thus cutting and breaking the cotton fiber into short lengths; sixth, engagement of the teeth with foreign matters in the lint, and consequent drawing of such matters through the slits and mixing of the same with the ginned cotton; seventh, danger from fire, owing to the saws striking stones, nails, or like hard substances in the cotton, and consequent high insurance rates and serious conflagrations and losses; eighth, liability of breakages of saws and ribs, owing to the presence of aforesaid foreign substances and contact of the rapidly-rotating saws therewith.

My present invention has for its object to overcome all of these difficulties either completely or in greater degree than has hitherto been attained. I define its principle as follows: to construct a ginning-cylinder having teeth which shall seize only the cotton fibers and not the seeds or other relatively hard foreign substances contained in the mass presented to its action, and shall strip or remove the cotton fiber wholly or in great degree from said seeds. By "ginning-cylinder" I mean a cylindrical body for drawing out the cotton lint from the seed-cotton to be substituted in place of the aggregation of saws now used in an ordinary gin, as above outlined. I have discovered that the beforementioned result can be accomplished by means of a cylinder having a hard periphery, in which periphery are numerous openings, and in each of which openings is secured a tooth fixed at one end and extending in said opening in a circumferential direction with reference to the cylinder, provided that the position of the free points or ends of said teeth shall approximate to the circumjacent level or surface of the periphery of cylinder, the said cylinder being rotated so that the teeth shall be presented points forward to the cotton. It is requisite, also, that there shall exist in front of and on each side of the end or point of each tooth a space or opening into which the lint, by reason of its softness and elasticity, may enter when the cotton is placed in contact with the surface of the cylinder, and into which space the seeds or hard foreign material not being soft and elastic cannot enter, and into which the seeds are also prevented from entering by reason of their size. When a cylinder provided with teeth arranged as described—that is, in openings in the periphery, and with their points disposed very slightly above, on a level with the immediately circumjacent portion of said periphery—then, by simply causing the cotton to lie in contact with said cylinder when rotating, with the points of the teeth forward, the lint will by its own elasticity enter the openings around the teeth in a radial direction toward the axis of cylinder, and will be engaged and drawn out by said teeth, while the hard bodies—such as the seed and foreign matters—will not be so engaged. In order, however, more effectively to remove the cotton from its seed, I preferably make use of another principle which I have discovered in addition to the foregoing, which is as follows, namely: to arrange the teeth in accordance with the first-mentioned principle of the invention, as already defined— that is, so that their points shall closely approximate the level of the circumjacent portions of the periphery—so that they will penetrate the soft fluffy coating of the cotten-seed to the hard surface thereof, and then begin their drawing-off of the fiber. The filamentous substance which constitutes cotton appears like a mass of vegetable hairs of various lengths rising from the surface of the seed and enveloping the same, while close to the surface is a fine adherent fluffy coating. In order to strip the seed clear, I find it is desirable not to rely solely upon the entering of the cotton surrounding it into the open space around the point of the tooth in a radial direction toward the center of the cylinder, (although excellent cleansing of the cotton can and has been done, depending solely upon the foregoing action,) but to give the tooth an actual thrust directly into the seed by reason of the rotation of the cylinder. In this way the tooth will penetrate through the soft proximate coating of the seed, and reach the hard surface, and then will draw the fiber clear and clean from the latter. In order to do this, space must be afforded not merely in front of and at each side of the point of the tooth, as thus far described, but also beneath the tooth, so that its point may be free to be pushed directly into the mass, or conversely, so that the cotton may enter below said point in a direction tangential to the circumference of the cylinder. I can accomplish this result in different ways, while still adhering to the requirements of the invention (that the points of the teeth must closely approximate the general level of the circumjacent portions of the cylinder.) It is important, however, to notice that if an elevation of the points of the teeth is resorted to, said elevation must not be such as to enable them to engage directly with any hard body, and if in practice this is found to be the case then the points are set too high, and must be depressed or lowered. In hereinafter describing a means for carrying my invention into practical effect a simple test is stated, which I have successfully used in setting the teeth. While actual elevation of the points above the general surface of the periphery distant farther in a radial direction from the axis is hereinafter described, it should be distinctly understood that this particular arrangement is not broadly essential, because, for example, I can accomplish the desired result by leaving the points at the level of the general surface of the cylinder and slightly depressing a small portion of the surface immediately in front of them; or I can make the surface of the cylinder corrugated in comparatively sharp curves, and cause the points of the teeth to lie on the general level of the corrugations along which they are disposed, in which case the outer ends of the openings will radially be nearer the axis of the cylinder than the points, and hence the cotton can enter said openings in a tangential direction and so meet the points. The specific construction of cylinders outlined in these examples is not claimed in this application, but is claimed in other applications now pending, filed November 15, 1884, and respectively numbered 148,019 and 148,020.

In carrying my invention into practice it follows, therefore, that there should exist in any embodiment thereof—

First. A cylindrical body having a hard external surface.

Second. Teeth having points disposed upon said periphery.

Third. The disposition of said teeth should be such as that they are secured to said periphery at one end, and have their outer sharp-pointed extremities on a level closely approximating that of the said periphery. The body of the tooth may or may not conform exactly to the curve of the outer surface of the cylinder so long as its point is disposed as stated.

Fourth. In front of and at each side of the point of each tooth there should extend a space or opening, into which the cotton may enter by reason of its softness or elasticity, and in this way become presented in order to be engaged by the tooth.

Preferably, fifth, there should be beneath the point of the tooth an opening into which the cotton may enter in a direction tangential to the circumference of the cylinder; or, conversely, the point of the tooth should protrude beyond the circumjacent parts to such a degree only as that by the rotation of the cylinder it may be thrust for a minute distance into the outer adherent coating of the seed.

I have discovered that with the new means above set forth—namely, a ginning-cylinder constructed in substantial accordance with the foregoing, a certain new, useful, and highly successful result is produced in the art of ginning cotton. I now proceed to specify that means, which may be constructed in a variety of different ways, but which I here set forth with reference to one particular embodiment, which is the best I now know wherein to carry my invention into practical effect, and which under conditions of careful and repeated experiment with full-sized practical working apparatus has given the most successful results.

Figure 6:
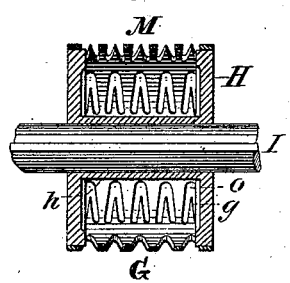
Figure 7:
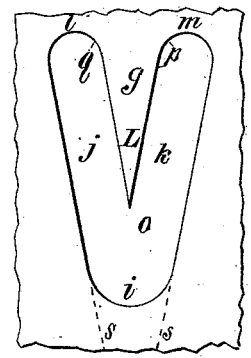
Figure 8:
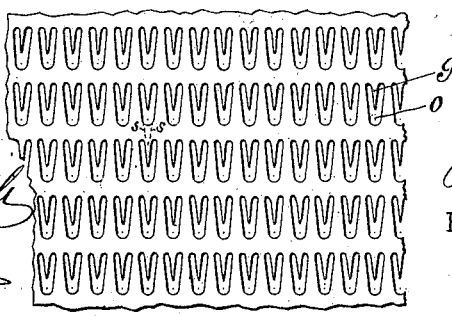

In the accompanying drawings, Figure 1 is an elevation of a ginning-cylinder constructed in substantial accordance with my invention. Fig. 2 is a sectional view of the same on the line $x\ x$ of Fig. 1. Figs. 3 and 4 are detailed views explanatory of the mode of arranging the teeth. Fig. 5 is a section of a cotton-gin of known form containing my invention. Fig. 6 represents one of the sections of which the cylinder shown in Fig. 1 may be composed. Fig. 7 represents one of the openings in said cylinder and its contained tooth enlarged; and Fig. 8 represents a portion of the periphery of the cylinder as made of sheet metal, and having teeth and slots of the actual dimensions and constructions as hitherto practically employed by me.

Similar letters of reference indicate like parts.

On referring to Fig. 5, it will be noticed that I employ no ribs or grating. A is the grate-fall or breast hinged to the main frame at $a$. B is the back board; C, the seed-board, and D the brush for removing the lint from the cylinder. E is the ginning-cylinder, which in the machine occupies substantially the same position as the saw-gin cylinder in common use, the grate, grid, or ribs being removed, and a bar, F, secured in the concave $c$. This bar I make preferably of steel. In operation it should be adjusted near to the surface of the cylinder E. I have found one-sixteenth inch to be a good working distance. The grate-fall or breast A being hinged, as already stated, is adjustable nearer to or farther from the frame, and as the bar F is secured in said breast the movement of the latter may bring said bar nearer to or farther from the cylinder-surface. I show no means of securing the breast A in different positions, as adjusted; but these will readily suggest themselves to any gin-builder or other person skilled in the art.

The cylinder E consists of a sheet or thin plate of metal, G, preferably steel, which is bent in a cylindrical shape, having its meeting edges secured together around heads or disks, preferably of wood. Said cylinder may consist of a number of smaller cylinders or sections, M, one of which is represented separately in Fig. 6. Each section then consists of two heads, H, and the sheet or thin plate G, bent, as described, and secured in any suitable way to said heads, and the heads are secured to a sleeve, $h$, which is adapted to receive the splined shaft I. The advantage of making the cylinder E of a number of sections, is that in case one section becomes injured it can easily be removed and another substituted. The several sections should be placed closely together side by side, and so fastened by any convenient means.

Before the sheet or thin plate G is secured upon the heads H, I form therein by punching or cutting a number of slots or openings, $o$, disposed longitudinally across the surface, or in direction of the axis of the cylinder to be formed. In each slot or opening I form a pointed tooth, $g$, from the material of said sheet and integral with it, said tooth lying lengthwise the slot. By reason of the tooth being tapered and pointed and arranged in the slot, there is an open space extending directly in front of the point of the tooth, and around the same on both sides. This is the opening already referred to, in which the cotton can enter by its elasticity and softness when pressed against the periphery of the cylinder.

The openings and teeth in the sheet G are made with the sheet flat. When the sheet is bent in cylindrical form, the teeth being attached only on one end will not naturally partake of the curved shape of the bent sheet, but will remain straight, or, in other words, will remain tangential to the circumference. Figs. 3 and 4 are intended to exhibit plainly the difference between teeth bent to follow the curve of the cylinder, Fig. 4, and those left straight as above described, Fig. 3. In Fig. 3 it will be seen that the straight teeth have their points L slightly above the general surface of the cylinder. I find in practice that this protrusion should be about one-half the thickness of the tooth when the sheet is made of No. 20 or 22 sheet-steel. A good general test for setting the teeth is that the points of the teeth should just be met by the edge of a knife-blade when the blade is laid flatwise on the periphery of the cylinder and immediately in front of said points. It will be seen that by this construction the teeth are straight or tangential to the curve of the sheet or plate.

By referring to Figs. 3 and 4 it will be apparent that when the cylinder rotates in the direction of the arrow 1 the cotton may enter the space around the point radially in the direction of the arrow 2. From Fig. 4 it will also be obvious that the cotton enters not only radially in the direction of arrow 2, but also tangentially and beneath the point in the direction of the arrow 3, so that the point L is in fact thrust lightly in the direction of its length into the cotton before the drawing out of the fiber begins. The elevation of the point is, however, so slight as not to enable it to engage with hard foreign substances in the cotton, while on the other hand it is sufficient to allow it to penetrate, as already stated, through the soft covering of the seed before drawing out the fiber, as the rotation of the cylinder continues.

Returning now to Fig. 5, the operation of the machine is as follows: The seed-cotton is placed in the receptacle K and meets the toothed surface of the cylinder E, which rotates in the direction of the arrow 4. The teeth upon said cylinder engage only with the cotton lint, as already described, and carry the same past and under the bar F, which prevents seeds and other foreign substances being drawn around the cylinder with the lint. As the cylinder continues its revolution, the lint is removed from its teeth by the brush-wheel D, from which the cleansed material passes out of the machine in the direction of the arrow 5.

I have found by experiment that there is a special advantage in constructing the slots and teeth, as more particularly shown enlarged in Fig. 7 of the drawings—that is to say, I make the said openings of V shape, so that the teeth are formed by the solid middle portion of the V. The re-entering angle $i$ of the V in front of the point L of the tooth I make rounded or concave in preference to acute, because a wider and more uniform area is afforded for the cotton to enter than would be the case were the angle sharply carried out, as indicated by the dotted lines, Figs. 7 and 8. It is obvious that with such an acute angle the cotton would have to enter into a very narrow space near the apex thereof, and besides this in such a wedge-shaped space the fiber is easily caught or jammed. This rounding of the re-entering angle of the V (and at the same time substantially cutting off its apex) also allows of a wider longitudinal rib of cylinder-surface being left between the parallel series of slots than would be the case with sharp-angled openings having the same area of effective space into which cotton could enter, so that the cylinder-periphery, especially when made of thin metal, is thus strengthened.

It will be noticed that the outer ends, $l\,m$, of converging parts $j\,k$ of the V-shaped opening are also made rounded or concave. The advantageous result here is twofold. First, the cotton is prevented from becoming wedged between the side of the base of the tooth and adjacent portion of the periphery, and, second, the lines $q\,p$ of junction of base of tooth and main portion of the periphery are curves, so that the base of the tooth gradually enlarges, rendering the tooth stronger at this point, and avoiding the danger of breakage by tearing, as might be the case if the sides of the tooth made a sharp angle with the adjacent parts from which the tooth extends.

With the same object of avoiding a wedge-shaped opening, I make the width of each aperture on each side of the tooth equal and uniform from the point where the base-curve of the tooth stops (or from the rounded or concave extremity of each aperture) to the point of the tooth—that is to say, the edges or sides of the tooth on one side of the openings and the opposite edges of the material of the cylinder on the other side should be parallel.

Wherever sharp, wedge-shaped apertures exist in cotton-ginning cylinders, the lint will jam or be caught in them, and the brush-wheel is apt to fail properly to clean the cylinder, and hence the importance will be apparent of constructing said apertures as much as possible free from tapering or converging portions. This principle I have embodied in the form of opening and teeth above described, which is the best I now know, and which works excellently well in practice.

I claim as my invention—

1. A cotton-ginning cylinder having in its periphery openings, and in each of said openings a tooth having its point at or slightly above the level of the general surface of said cylinder, the said tooth being straight, flat, or tangential to the circumference of the cylinder, substantially as described.

2. A cotton-ginning cylinder having a periphery of thin metal containing openings or slots, and in each of said openings a tooth extending in a circumferential or nearly circumferential direction, and formed integrally of the metal of said periphery, the said tooth having the upper surface of its pointed end elevated above the adjacent portion of the periphery for a distance not exceeding the thickness of the metal sheet from which said tooth is formed, substantially as described.

3. In a cotton-gin, a cotton-ginning cylinder having in its periphery a series of V-shaped openings, each opening forming a slot or recess, with a contained tooth constituting the solid middle portion of the V, the outer ends of the converging portions of said opening being rounded or concave, and the widths of said portions being substantially uniform on each side of the tooth, substantially as described.

4. In a cotton-gin, the combination of a stationary retaining bar or plate for the material to be acted upon, and a rotary cylinder having in its periphery openings, and in each of said openings a single tooth having its point disposed at or slightly above the general surface of said cylinder, substantially as described.

5. In a cotton-gin, the combination of a receptacle for the seed-cotton, a retaining bar or plate for the same, and a rotary cylinder having in its periphery openings, and in said openings teeth extending in a circumferential direction, having their points disposed at or slightly above the general surface of said cylinder, substantially as described.

6. In a cotton-gin, the combination of an adjustable breast, a stationary retaining plate or bar for the seed-cotton attached thereto, and a rotary cylinder having in its periphery openings and in said openings teeth extending in a circumferential direction, having their points disposed at or slightly above the general surface of said cylinder, substantially as described.

CHARLES T. MASON, JR.

Witnesses:
T. J. KEANE,
JOHN J. BOWEN.